(12) United States Patent
Choi

(10) Patent No.: US 6,317,136 B1
(45) Date of Patent: Nov. 13, 2001

(54) MOTION VECTOR DETECTING DEVICE

(75) Inventor: Geon-Young Choi, Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/222,941

(22) Filed: Dec. 30, 1998

(30) Foreign Application Priority Data

Dec. 31, 1997 (KR) .................................................. 97-80509

(51) Int. Cl.⁷ ....................................................... G06F 13/00
(52) U.S. Cl. ............................................. 345/537; 348/699
(58) Field of Search ..................................... 345/536–538, 345/530–532, 547, 555; 348/699

(56) References Cited

U.S. PATENT DOCUMENTS 5,699,129 * 12/1997 Tayama ................................ 348/699

FOREIGN PATENT DOCUMENTS

| 2-224490 | 9/1990 | (JP) . |
| 3-247190 | 11/1991 | (JP) . |
| 8-107557 | 4/1996 | (JP) . |

* cited by examiner

*Primary Examiner*—Kee M. Tung
(74) *Attorney, Agent, or Firm*—Sughrue, Mion, Zinn, Macpeak & Seas, PLLC

(57) ABSTRACT

A motion vector detecting device is provided. In the motion vector detecting device, a global memory stores the pixels of a current picture and a reference picture, and a local memory is provided. A first buffer buffers the pixels of a subsampled macro block and a subsampled first search area, a motion vector detector receives the pixels of the subsampled macro block and first search area from the first buffer and detects a first motion vector, and a second buffer latches the first motion vector received from the motion vector detector. A main processor reads the pixels of a macro block in the current picture and a first search area in the reference picture from the global memory, stores the read pixels in the local memory, subsamplers stored pixels, stores the subsampled pixels in the first buffer, reads the first motion vector from the second buffer, and detects a second motion vector of the macro block by a software program from a second search area including a pixel indicated by the first motion vector and blocks having reference pivots at pixels around the pixel in the reference picture.

2 Claims, 5 Drawing Sheets

MOTION VECTOR DETECTING DEVICE

BACKGROUND OF THE INVENTION

1. Field of the Invention

The present invention relates to a moving picture compressing device, and in particular, to a motion vector detecting device for detecting a motion vector in real time.

2. Description of the Related Art

Motion vector detection is widely used for moving picture compression of H.261, MPEG1 (Moving Picture Experts Group 1) or MPEG2 due to its significance in reducing the temporal redundancy between adjacent pictures. However, a large number of operations involved in the motion vector detection makes real time implementation difficult.

In general, a block based motion search algorithm is used for motion vector detection. A description of motion vector detection according to the algorithm will hereinbelow be given referring to FIG. 1. A block having the smallest mean absolute error (MAE) with respect to a macro block MB having MiN pixels in an n-th frame being a current picture is searched in a search area SR of an (n−1)-th frame being a reference picture. The block having the smallest MAE in the (n−1)-th frame is called a best matched block BM. The search area SR is comprised of blocks whose reference points range between (x−P, y−P) and (x+P, y+P) relative to the reference point (x, y) of the macro block MB. and includes (M+2P)x(N+2P) pixels. The MAE is calculated by $$MAE(i, j) = \frac{1}{MN} \sum_{k=0}^{M-1} \sum_{l=0}^{N-1} |C(x+k, y+l) - R(x+i+k, y+j+l)| \quad (1)$$

where C(x+k, y+1) indicates a pixel in the macro block of the current picture, R(x+i+k, y+j+1) indicates a pixel in a macro block of the reference picture.

The motion vector MV of the macro block MB is the vector between the reference points of the macro block MB and the best matched block BM. For example, if the reference points of the macro block MB and the best matched block BM are given as (x,y) and (x+u, y+v) respectively, the motion vector MV is (u,v).

To search for the best matched block BM in the reference picture, MAEs should be obtained in each search point through operations such as subtraction, calculation of absolute values, and summation, as shown in equation 1.

The above conventional motion vector detection is not viable with software alone because of too many operations. Assuming that a search range is between +P and −P, the size of a reference picture is IxJ pixels, the size of a macro block MB is MxN pixels, and input pictures should be processed at a rate of F frames per second, the number of required operations is given by $$operations = \frac{IJF}{MN}(2P+1)^2 \times MN \times 3 \quad (2)$$

If M=N=16, I=720, J=480, F=30, and P=15, a total number of required operations is 29.89 GOPS (Giga Operations Per Second).

Therefore, a motion vector detection algorithm was implemented using a motion vector detecting VLSI chip such as ST13220 chip of SGS-Thomson as a coprocessor in the prior art. Here, the ST13220 chip can be operated at a pixel rate of 18 MHz in maximum, and detect the motion vector of a 8×8 or 16×16-pixel macro block at a reference point (0,0), for example, in a search area comprised of blocks at reference points ranging from (−8, −8) to (+7, +7).

However, the general video compression algorithm such as the MPEG2 standard or the ITU-T (International Telecommunication Union-Telecommunication Sector) image communication standard H.261 provides that the motion vector of a 16×16-pixel macro block at a reference point (0, 0), for example, should be detected in a search area comprised of blocks at reference points ranging from (−16, −16) to (+15, +15). Thus, to make a search in the search area, four ST13220 chips are arranged in parallel or the search area is divided into four parts to allow a single ST13220 chip to detect a motion vector in each part.

However, the former case increases hardware size and cost, whereas the latter case increases process time and makes real time processing difficult despite the advantage of reduced hardware size.

SUMMARY OF THE INVENTION

An object of the present invention is to provide a motion vector detecting device for detecting a motion vector in real time by use of simple hardware.

To achieve the above object, there is provided a motion vector detecting device. In the motion vector detecting device, a global memory stores the pixels of a current picture and a reference picture, and a local memory is provided. A first buffer buffers the pixels of a subsampled macro block and a subsampled first search area, a motion vector detector receives the pixels of the subsampled macro block and first search area from the first buffer and detects a first motion vector, and a second buffer latches the first motion vector received from the motion vector detector. A main processor reads the pixels of a macro block in the current picture and a first search area in the reference picture from the global memory, stores the read pixels in the local memory, subsamples the stored pixels, stores the subsampled pixels in the first buffer, reads the first motion vector from the second buffer, and detects a second motion vector of the macro block by a software program from a second search area including a pixel indicated by the first motion vector and blocks having reference points at pixels around the pixel in the reference picture.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
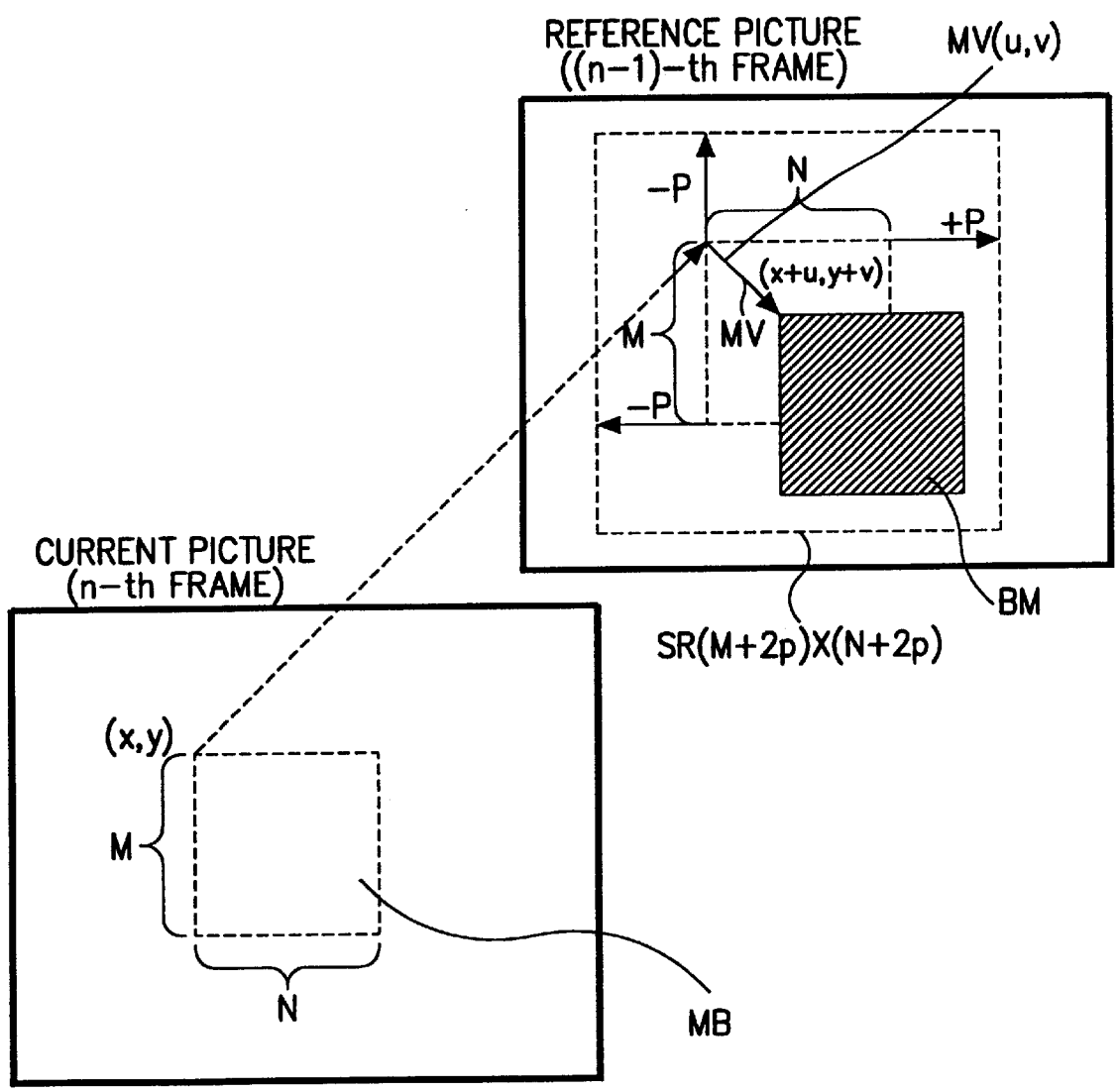
FIG. 1 schematically illustrates conventional motion vector detection.
Figure 2:
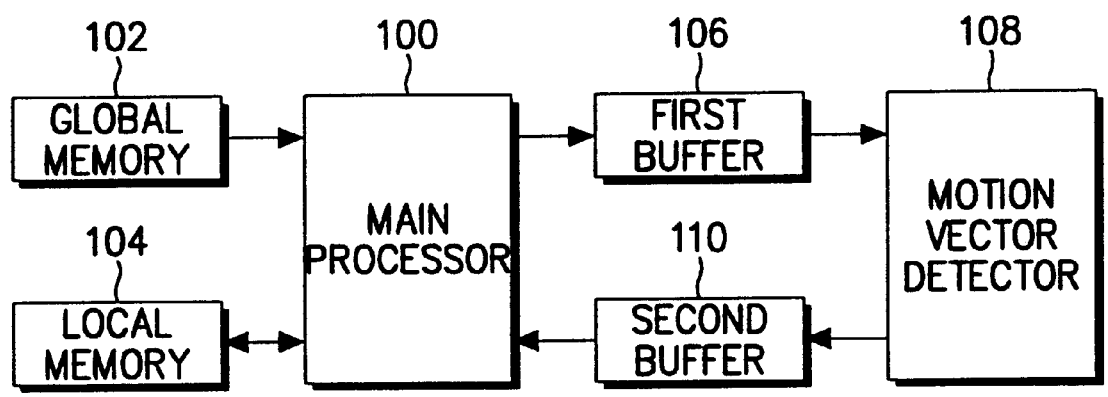
FIG. 2 is a block diagram of a motion vector detecting device according to a preferred embodiment of the present invention.

FIG. 2 is a block diagram of a motion vector detecting device according to a preferred embodiment of the present invention. A main processor 100 controls the entire image processing apparatus having the motion vector detecting device of the present invention. In particular, the main processor 100 reads the pixels of a macro block in a current picture and the pixels of a first search area SR1 in a reference picture from a global memory 102 having pixels of a plurality of pictures stored therein, to detect a motion vector of the macro block. The first search area SR1 is comprised of blocks at reference points ranging from (−16, −16) to (+15, +15) relative to the reference point, for example, (0,0) of a 16×16-pixel macro block, as shown in FIG. 4B, and Includes 47×47 pixels.

After reading the pixels of the macro block and the first search are a SR1, the main processor 100 performs a 2:1 subsampling on the pixels of the macro block and the first search area SR1 in horizontal and vertical directions so that they have 8×8 pixels and 23×23 pixels, respectively.

Then, the main processor 100 provides the pixels of the subsampled macro block MB and the first search area SRi to a first buffer 106. The first buffer 106 may be a FIFO (First-In First-Out) buffer. A motion vector detecting device such as ST13220 chip may be used for the motion vector detecting coprocessor 108. The motion vector detecting coprocessor 108 receives the data from the first buffer 106, performs a motion estimation on the data, and stores the resulting first motion vector in a second buffer 110.

In a more detailed description of the motion vector detection, the motion vector detecting coprocessor 108 receives the subsampled 8×8 pixels of the macro block and the subsampled 23×23 pixels of the first search area from the first buffer 106, searches for an 8×8-pixel block having the smallest MAEs with respect to he subsampled macro block in the subsampled first search area, and detects the first motion vector.

The motion vector detecting coprocessor 108 provides the first motion vector to the second buffer 110 and notifies the main processor 100 of the detection of the first motion vector. A latch may be used as the second buffer 110. Upon reception of the information on the first motion vector detection from the motion vector detecting coprocessor 108, the main processor 100 reads the first motion vector from the second buffer 110. Then, the main processor 100 reads the pixels of 16×16-pixel block represented by the first motion vector, the pixels of 16×16-pixel blocks having reference points at its adjacent eight pixels, and the pixels of the macro block from the global memory 102. The main processor 100 calculates MAEs of the block represented by the first motion vector and the blocks having the reference points at the eight pixels adjacent to the first motion vector, searches for a block having the smallest MAE, and detects a second motion vector. Here, the non-subsampled pixels of the search area can be stored in the local memory 104 to detect the first and second motion vectors. For detection of the first motion vector, the main processor 100 reads the pixels of the search area and the macro block from the local memory 104, subsamples the pixels, and stores the subsampled pixels In the first buffer 106. Then, for detection of the second motion vector, the main processor 100 reads the 16×16 pixels represented by the first motion vector and the pixels of non-subsampled blocks having reference points at the eight pixels adjacent to the pixel from the local memory 104 and detects the second motion vector.

Figure 3:
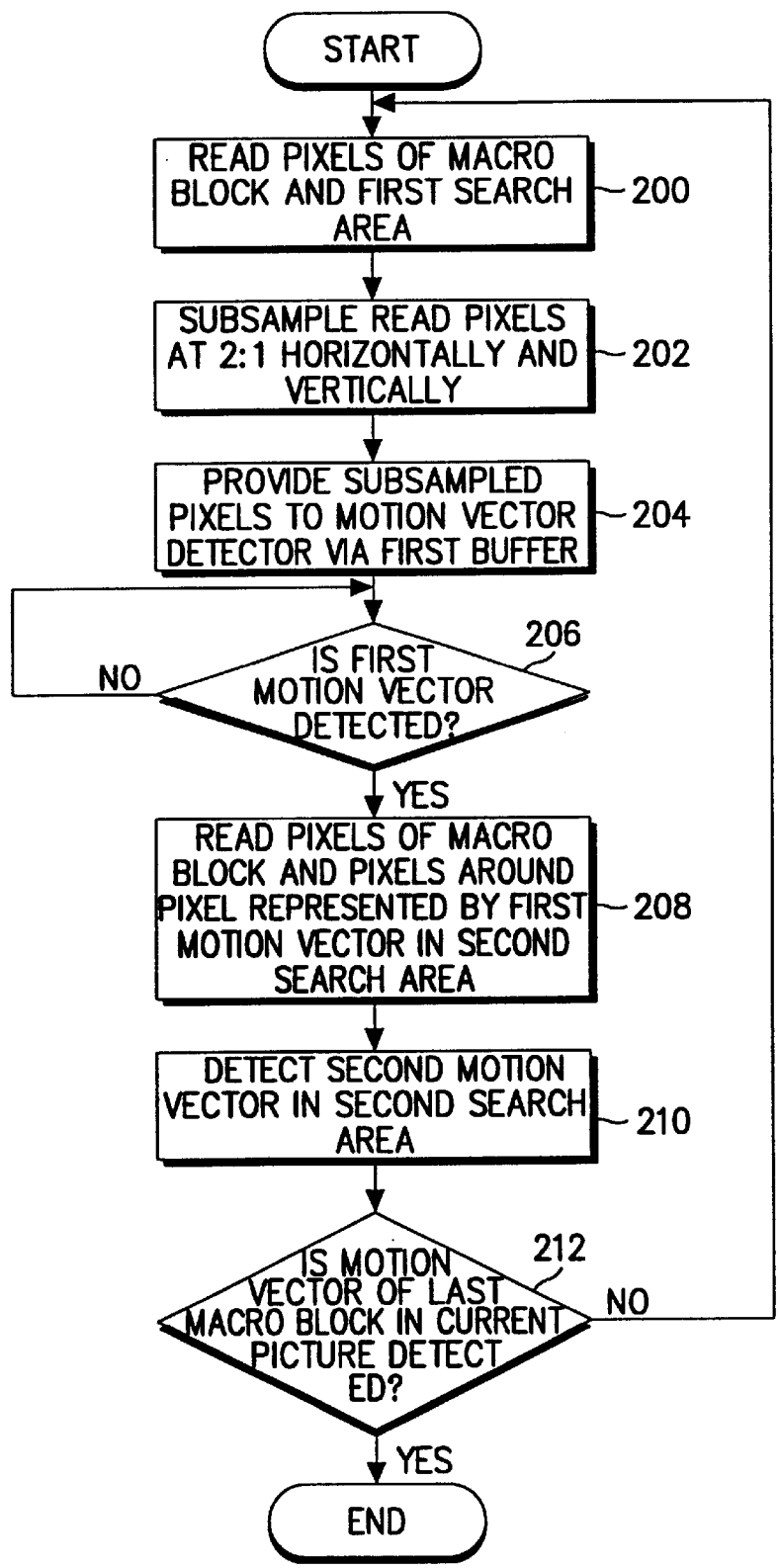
FIG. 3 is a flowchart illustrating the operation of the main processor shown in FIG. 2.
Figure 4A:
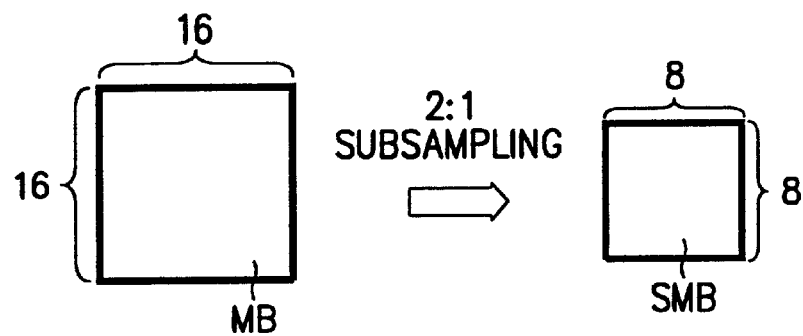
FIG. 4A illustrates subsampling of a macro block.
Figure 4B:
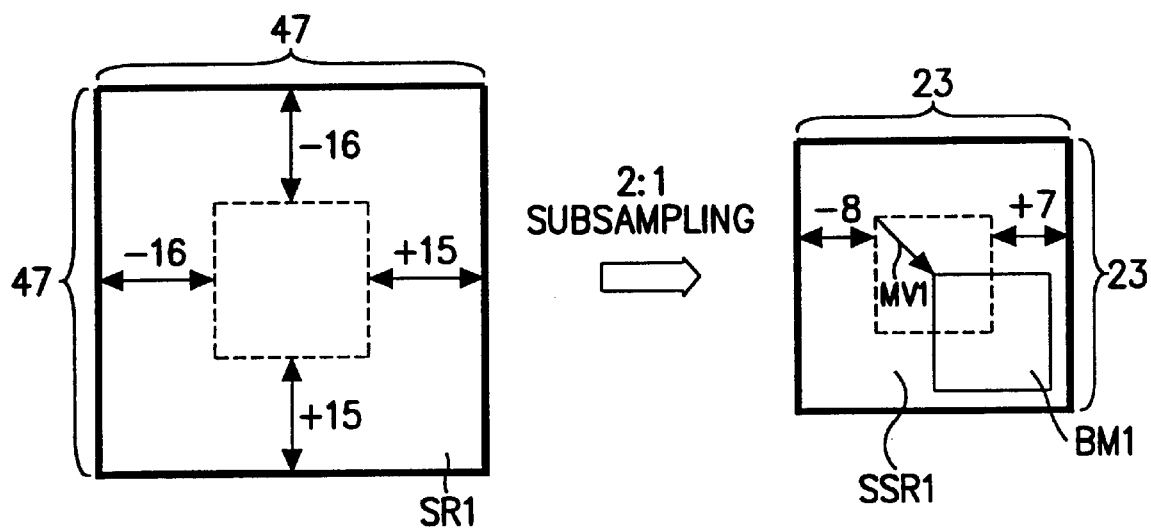
FIG. 4B illustrates subsampling of a search area.
Figure 5:
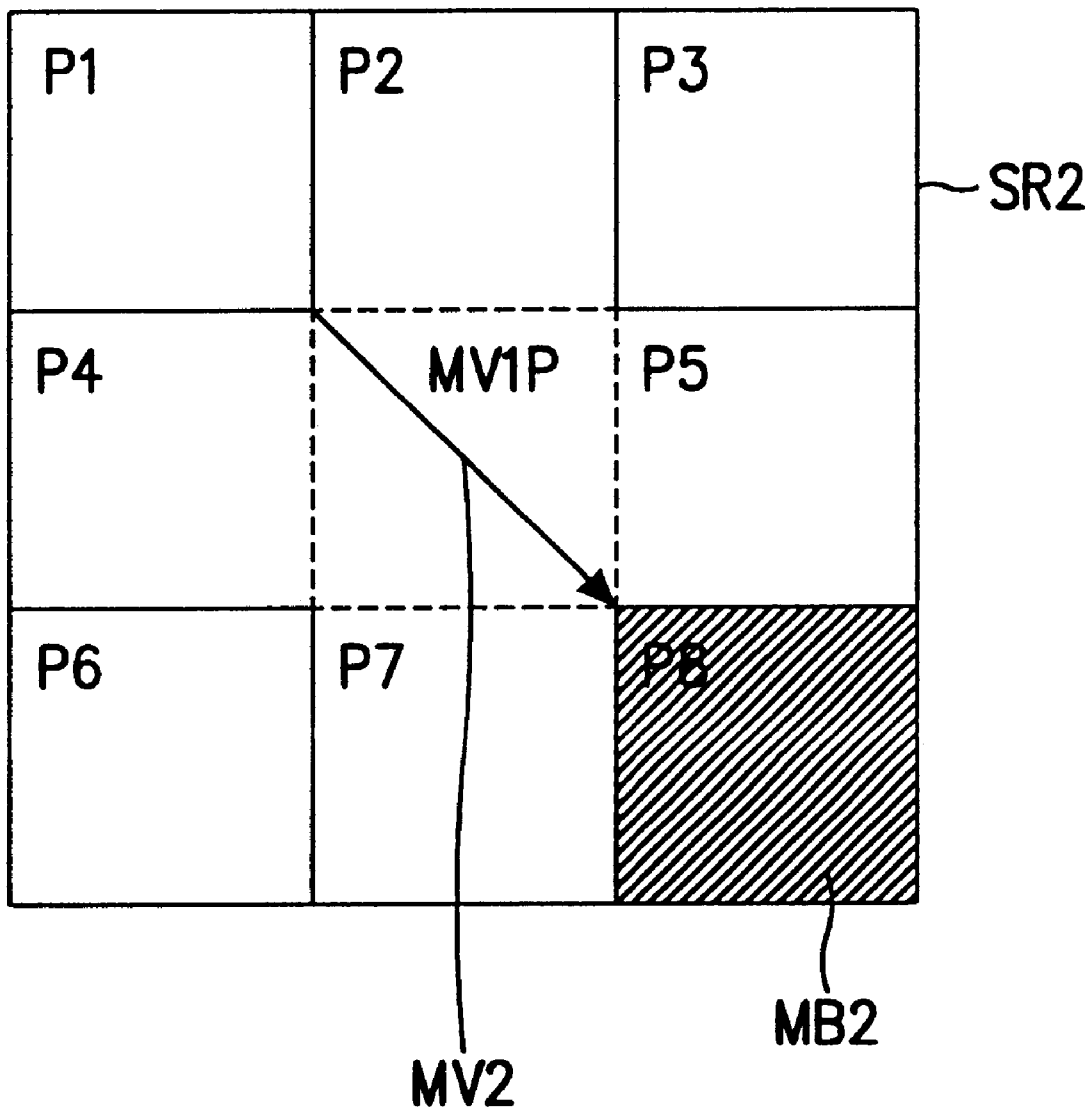
FIG. 5 illustrates motion vector detection of the main processor.

FIG. 3 is a flowchart illustrating the operation of the main processor shown in FIG. 2, FIGS. 4A and 4B illustrates subsampling of the macro block and the search area, respectively, and FIG. 5 illustrates motion vector detection of the main processor. Referring to these drawings, the operation of the motion vector detecting device according to the preferred embodiment of the present invention will be described in detail.

In step 200, the main processor 100 reads from the global memory 102 the pixels of a macro block in a current picture and the pixels of a first search area in a reference picture, to detect a motion vector of the macro block.

In step 202, the main processor 100 subsamples the pixels of the macro block and the first search area horizontally and vertically at 2:1. Referring to FIGS. 4A and 4B, the 16×16-pixel macro block MB is reconstruction into an 8×8-pixel subsampled macro block SMB, while the 47×47-pixel first search area SRI is reconstructed into a 23×23-pixel subsampled search area SSR1, by 2:1 subsampling. In step 204, the main processor 100 provides the subsampled pixels of the macro block and the first search area to the buffer 106 and then drives the motion vector detector 108. Upon reception of a driving command of the main processor 100, the motion vector detector 108 receives data loaded in the first buffer 106, detects a first motion vector, latches the first motion vector in the second buffer 110, and notifies the main processor 100 of the detection of the first motion vector. In step 206, the main processor 110 determines whether the motion vector detector 108 provides the information of the first motion vector S detection. If the information is provided from the motion vector detector 108, the procedure goes to step 208. Otherwise, the main processor 100 waits for the motion vector detector 108 to provide the information of the first motion vector detection.

In step 208, the main processor 100 reads the first motion vector from the second buffer 110, and then reads the pixels of the corresponding macro block in the current picture and the pixels of a second search area in the reference picture from the global memory 102. The second search area includes the 16×16 pixel block represented by the first motion vector and the 16×16-pixel blocks having reference points at eight pixels adjacent to the pixel. Referring to FIG. 5, the second search area has a pixel MV1P represented by the first motion vector and the pixels of 16×16-pixel blocks having reference points at eight pixels P1 to P8 adjacent to the pixel MV1P. In step 210, the main processor 110 calculates MAEs of the pixel represented by the first motion vector and the 16×16 pixel blocks having reference points at the eight pixels adjacent to the pixel with respect to the 16×16 pixels of the macro block searches for a block having the smallest MAE, and detects a second motion vector.

When the second motion vector is completely detected, the main processor 100 determines whether the macro block is the last one in the current picture. If it is, the procedure is over. Otherwise, the procedure goes back to step 200 to process the next macro block.

As described above, the macro block and the search area are subsampled in the main processor and then a subsampled motion vector is detected with double pixel value precision in the motion vector detector of hardware. Then, the main processor detects a motion vector with integer pixel value precision in the search area including a pixel represented by the motion vector with double pixel value precision and blocks having reference points at eight pixels around the pixel. This motion vector detecting method involves the number of operations given by $$MV=2MV_1+MV_2(-8<MV_1<+7, -1MV_2+1) \qquad (3)$$

Thus, with a combination of simple hardware and software, that is, by use of a single motion vector detector, buffers, and a two-step hierarchical motion searching method, the block based motion search algorithm can effectively be implemented in real time.

Furthermore, the number of operations is remarkably reduced to 6912(=9×16×16×3) for detecting the motion vector of a 16×16-pixel block in the present invention from that 786432(=16+15+1)$^2$×16$^2$×3) in the prior art using software alone.

What is claimed is:

1. A motion vector detecting device comprising:
    a global memory for storing pixels of a current picture and a reference picture;
    a local memory;
    a first buffer for buffering pixels of a subsampled macro block and a subsampled first search area;
    a motion vector detector for receiving and detecting a first motion vector from the pixels of the subsampled macro block and the subsampled first search area from the first buffer;
    a second buffer for latching the first motion vector received from the motion vector detector; and
    a main processor for reading the pixels of a macro block in the current picture and the pixels of the first search area in the reference picture from the global memory, storing the read pixels in the local memory, subsampling the pixels stored in the local memory, storing the subsampled pixels in the first buffer, reading the first motion vector from the second buffer, and detecting a second motion vector of the macro block from a second search area including a pixel indicated by the first motion vector and blocks having reference points at pixels around a pixel in the reference picture.

2. A motion vector detecting device comprising:
    a global memory for storing pixels of a current picture and a reference picture;
    a local memory;
    a first buffer for buffering pixels of a (M/2×N/2)-pixel block 2:1 subsampled from a macro block comprising M×N pixels, and a ((M+2P)/2×(N+2P)/2)-pixel block 2:1 subsampled from a first search area comprising ((M+2P)×(N+2P)) pixels, wherein P is a search area range;
    a motion vector detector for receiving and detecting a first motion vector based on the pixels of the subsampled macro block and the first search area from the first buffer;
    a second buffer for receiving and latching the first motion vector from the motion vector detector; and
    a main processor for reading the pixels of the M×N-pixels macro block in the current picture and the pixels of the ((M+2P)×(N+2P))-pixel first search area in the reference picture from the global memory, storing the read pixels in the local memory, subsampling the pixels stored in the local memory to ((M/2×(N/2)) pixels and ((M+2P/2) pixels, respectively, storing the subsampled pixels in the first buffer, reading the first motion vector from the second buffer, and detecting a second motion vector of the macro block from a second search area including a pixel indicated by the first motion vector and M×N-pixel blocks having reference points at pixels around a pixel in the reference picture.

* * * * *